US008359368B1

(12) United States Patent
Wesinger, Jr. et al.

(10) Patent No.: US 8,359,368 B1
(45) Date of Patent: *Jan. 22, 2013

(54) MULTI-HOMED WEB SERVER WITH ANIMATION PLAYER

(75) Inventors: Ralph E. Wesinger, Jr., San Jose, CA (US); Christopher D. Coley, Morgan Hill, CA (US)

(73) Assignee: GraphOn Corporation, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/341,626

(22) Filed: Dec. 30, 2011

Related U.S. Application Data

(60) Continuation of application No. 12/841,045, filed on Jul. 21, 2010, now Pat. No. 8,117,298, which is a continuation of application No. 11/156,994, filed on Jun. 16, 2005, now abandoned, which is a continuation of application No. 10/700,407, filed on Nov. 3, 2003, now Pat. No. 7,386,880, which is a continuation of application No. 09/189,697, filed on Nov. 10, 1998, now Pat. No. 6,647,422, which is a division of application No. 08/607,068, filed on Feb. 26, 1996, now Pat. No. 5,870,550.

(51) Int. Cl.
*G06F 15/16* (2006.01)

(52) U.S. Cl. ........................................ 709/217; 709/203

(58) Field of Classification Search ................. 709/217, 709/218, 219, 223, 230, 203
See application file for complete search history.

(56) References Cited

U.S. PATENT DOCUMENTS

| 4,201,889 A | 5/1980 | Lawrence et al. |
| 4,310,727 A | 1/1982 | Lawser |
| 4,348,554 A | 9/1982 | Asmuth |
| 4,453,247 A | 6/1984 | Suzuki et al. |
| 4,554,659 A | 11/1985 | Blood et al. |
| 4,565,903 A | 1/1986 | Riley |
| 4,570,217 A | 2/1986 | Allen et al. |
| 4,665,500 A | 5/1987 | Poland |
| 4,683,563 A | 7/1987 | Rouse et al. |
| 4,730,312 A | 3/1988 | Johnson |
| 4,736,364 A | 4/1988 | Basso et al. |
| 4,748,658 A | 5/1988 | Gopal |
| 4,823,338 A | 4/1989 | Chan et al. |
| 4,853,955 A | 8/1989 | Thorn et al. |
| 4,896,319 A | 1/1990 | Lidinsky et al. |
| 4,914,619 A | 4/1990 | Harris et al. |
| 4,916,690 A | 4/1990 | Barri |
| 4,926,416 A | 5/1990 | Weik |
| 4,979,118 A | 12/1990 | Kheradpir |
| 4,985,889 A | 1/1991 | Frankish et al. |
| 4,991,204 A | 2/1991 | Yamamoto et al. |
| 4,993,014 A | 2/1991 | Gordon |
| 5,003,584 A | 3/1991 | Benyacar |

(Continued)

OTHER PUBLICATIONS

Berners-Lee, T. et al., "Hypertext Transfer Protocol—HTTP/1.0", Feb. 19, 1996.

(Continued)

*Primary Examiner* — Joseph Avellino
*Assistant Examiner* — Marshall McLeod
(74) *Attorney, Agent, or Firm* — Lewis and Roca LLP

(57) ABSTRACT

A multi-homed web server is disclosed including a plurality of virtual hosts operable in a web server. The multi-web server is configured to serve animations to clients over the web. The multi-web server may determine whether the specified time to send a subsequent graphic in a series of graphics has passed, and if the specified time has passed, then send a next graphic the next appropriate time.

15 Claims, 6 Drawing Sheets

U.S. PATENT DOCUMENTS

| | | | |
|---|---|---|---|
| 5,016,162 A | 5/1991 | Epstein et al. |
| 5,018,191 A | 5/1991 | Catron et al. |
| 5,036,318 A | 7/1991 | Bachhuber et al. |
| 5,048,081 A | 9/1991 | Gavaras |
| 5,058,104 A | 10/1991 | Yonehara et al. |
| 5,067,123 A | 11/1991 | Hyodo et al. |
| 5,073,890 A | 12/1991 | Danielsen |
| 5,075,884 A | 12/1991 | Sherman et al. |
| 5,084,867 A | 1/1992 | Tachibana et al. |
| 5,086,461 A | 2/1992 | Thorn et al. |
| 5,089,954 A | 2/1992 | Rago |
| 5,091,903 A | 2/1992 | Schrodi |
| 5,101,404 A | 3/1992 | Kunimoto et al. |
| 5,115,431 A | 5/1992 | Williams et al. |
| 5,163,057 A | 11/1992 | Grupp |
| 5,166,931 A | 11/1992 | Riddle |
| 5,168,492 A | 12/1992 | Beshai et al. |
| 5,185,743 A | 2/1993 | Murayama |
| 5,193,110 A | 3/1993 | Jones et al. |
| 5,204,857 A | 4/1993 | Obara |
| 5,208,811 A | 5/1993 | Kashio et al. |
| 5,214,646 A | 5/1993 | Yacoby |
| 5,216,669 A | 6/1993 | Hofstetter et al. |
| 5,218,602 A | 6/1993 | Grant et al. |
| 5,231,631 A | 7/1993 | Buhrke et al. |
| 5,231,633 A | 7/1993 | Hluchyj et al. |
| 5,233,607 A | 8/1993 | Barwig et al. |
| 5,239,539 A | 8/1993 | Uchida et al. |
| 5,239,542 A | 8/1993 | Breidenstein et al. |
| 5,249,178 A | 9/1993 | Kurano et al. |
| 5,251,255 A | 10/1993 | Epley |
| 5,253,247 A | 10/1993 | Hirose et al. |
| 5,255,266 A | 10/1993 | Watanabe et al. |
| 5,258,752 A | 11/1993 | Fukaya et al. |
| 5,258,979 A | 11/1993 | Oomuro et al. |
| 5,268,895 A | 12/1993 | Topper |
| 5,271,010 A | 12/1993 | Miyake |
| 5,274,680 A | 12/1993 | Sorton et al. |
| 5,278,889 A | 1/1994 | Papanicolaou et al. |
| 5,282,244 A | 1/1994 | Fuller et al. |
| 5,285,441 A | 2/1994 | Bansal et al. |
| 5,289,472 A | 2/1994 | Cho |
| 5,291,479 A | 3/1994 | Vaziri et al. |
| 5,291,492 A | 3/1994 | Andrews et al. |
| 5,301,270 A | 4/1994 | Steinberg et al. |
| 5,311,509 A | 5/1994 | Heddes et al. |
| 5,317,562 A | 5/1994 | Nardin et al. |
| 5,323,389 A | 6/1994 | Bitz et al. |
| 5,327,421 A | 7/1994 | Hiller et al. |
| 5,327,433 A | 7/1994 | Hall |
| 5,329,308 A | 7/1994 | Binns et al. |
| 5,339,318 A | 8/1994 | Tanaka |
| 5,345,443 A | 9/1994 | D'Ambrogio et al. |
| 5,345,445 A | 9/1994 | Hiller et al. |
| 5,345,446 A | 9/1994 | Hiller et al. |
| 5,357,510 A | 10/1994 | Norizuki et al. |
| 5,361,256 A | 11/1994 | Doeinger et al. |
| 5,363,433 A | 11/1994 | Isono |
| 5,365,524 A | 11/1994 | Hiller et al. |
| 5,367,566 A | 11/1994 | Moe et al. |
| 5,373,504 A | 12/1994 | Tanaka et al. |
| 5,375,124 A | 12/1994 | D'Ambrogio |
| 5,375,242 A | 12/1994 | Kumar et al. |
| 5,377,186 A | 12/1994 | Wegner |
| 5,384,771 A | 1/1995 | Isidoro et al. |
| 5,384,840 A | 1/1995 | Blatchford et al. |
| 5,392,402 A | 2/1995 | Robrock |
| 5,394,393 A | 2/1995 | Brisson et al. |
| 5,394,398 A | 2/1995 | Rau |
| 5,394,402 A | 2/1995 | Ross |
| 5,400,339 A | 3/1995 | Sekine et al. |
| 5,410,598 A | 4/1995 | Shear |
| 5,412,654 A | 5/1995 | Perkins |
| 5,414,701 A | 5/1995 | Shtayer et al. |
| 5,418,783 A | 5/1995 | Yamaki et al. |
| 5,420,857 A | 5/1995 | Jurkevich |
| 5,420,858 A | 5/1995 | Marshall et al. |
| 5,420,916 A | 5/1995 | Sekiguchi |
| 5,421,011 A | 5/1995 | Camillone et al. |
| 5,422,882 A | 6/1995 | Hiller |
| 5,425,090 A | 6/1995 | Orriss |
| 5,426,636 A | 6/1995 | Hiller et al. |
| 5,428,607 A | 6/1995 | Hiller et al. |
| 5,428,609 A | 6/1995 | Eng et al. |
| 5,434,852 A | 7/1995 | LaPorta |
| 5,434,981 A | 7/1995 | Lenihan et al. |
| 5,440,563 A | 8/1995 | Isidoro et al. |
| 5,442,630 A | 8/1995 | Gagliardi et al. |
| 5,444,702 A | 8/1995 | Burnett |
| 5,444,703 A | 8/1995 | Gagliardi et al. |
| 5,444,713 A | 8/1995 | Backaus et al. |
| 5,446,738 A | 8/1995 | Kim et al. |
| 5,450,394 A | 9/1995 | Gruber |
| 5,452,297 A | 9/1995 | Hiller et al. |
| 5,453,980 A | 9/1995 | Van Engelshoven |
| 5,453,981 A | 9/1995 | Katsube et al. |
| 5,454,034 A | 9/1995 | Martin |
| 5,457,681 A | 10/1995 | Gaddis |
| 5,457,684 A | 10/1995 | Bharucha |
| 5,463,552 A | 10/1995 | Wilson et al. |
| 5,463,620 A | 10/1995 | Sriram |
| 5,463,621 A | 10/1995 | Suzuki |
| 5,473,602 A | 12/1995 | McKenna et al. |
| 5,473,677 A | 12/1995 | D'Amato |
| 5,473,679 A | 12/1995 | LaPorta et al. |
| 5,477,537 A | 12/1995 | Dankert et al. |
| 5,479,401 A | 12/1995 | Bitz et al. |
| 5,479,402 A | 12/1995 | Hata et al. |
| 5,479,407 A | 12/1995 | Ko |
| 5,479,475 A | 12/1995 | Grob et al. |
| 5,479,495 A | 12/1995 | Blumhardt |
| 5,483,527 A | 1/1996 | Doshi et al. |
| 5,485,455 A | 1/1996 | Dobbins et al. |
| 5,490,251 A | 2/1996 | Clark et al. |
| 5,491,694 A | 2/1996 | Oliver |
| 5,495,484 A | 2/1996 | Self et al. |
| 5,499,290 A | 3/1996 | Koster |
| 5,502,726 A | 3/1996 | Fischer |
| 5,504,742 A | 4/1996 | Kakuma et al. |
| 5,506,844 A | 4/1996 | Rao |
| 5,509,010 A | 4/1996 | LaPorta |
| 5,509,123 A | 4/1996 | Dobbins et al. |
| 5,513,178 A | 4/1996 | Tanaka |
| 5,515,359 A | 5/1996 | Zheng |
| 5,519,707 A | 5/1996 | Subramanian et al. |
| 5,521,597 A | 5/1996 | Dimitri |
| 5,521,910 A | 5/1996 | Matthews |
| 5,522,042 A | 5/1996 | Fee et al. |
| 5,526,413 A | 6/1996 | Cheston, III et al. |
| 5,526,414 A | 6/1996 | Bedard et al. |
| 5,530,698 A | 6/1996 | Kozaki et al. |
| 5,533,106 A | 7/1996 | Blumhardt |
| 5,539,815 A | 7/1996 | Samba |
| 5,539,816 A | 7/1996 | Pinard et al. |
| 5,539,884 A | 7/1996 | Robrock |
| 5,541,918 A | 7/1996 | Gunmukhi et al. |
| 5,541,926 A | 7/1996 | Saito et al. |
| 5,544,152 A | 8/1996 | Obermanns et al. |
| 5,544,161 A | 8/1996 | Bigham et al. |
| 5,548,580 A | 8/1996 | Buckland |
| 5,550,816 A | 8/1996 | Hardwick et al. |
| 5,550,819 A | 8/1996 | Duault |
| 5,550,914 A | 8/1996 | Clark et al. |
| 5,557,320 A | 9/1996 | Krebs |
| 5,563,939 A | 10/1996 | LaPorta et al. |
| 5,566,173 A | 10/1996 | Steinbrecher |
| 5,568,475 A | 10/1996 | Doshi et al. |
| 5,570,368 A | 10/1996 | Murakami et al. |
| 5,577,039 A | 11/1996 | Won et al. |
| 5,579,311 A | 11/1996 | Chopping et al. |
| 5,581,600 A | 12/1996 | Watts |
| 5,583,862 A | 12/1996 | Callon |
| 5,583,863 A | 12/1996 | Darr, Jr. |
| 5,583,864 A | 12/1996 | Lightfoot et al. |
| 5,586,177 A | 12/1996 | Farris |
| 5,587,999 A | 12/1996 | Endo |
| 5,590,181 A | 12/1996 | Hogan |

| | | |
|---|---|---|
| 5,592,477 A | 1/1997 | Farris et al. |
| 5,598,536 A | 1/1997 | Slaughter, III et al. |
| 5,600,640 A | 2/1997 | Blair et al. |
| 5,600,643 A | 2/1997 | Robrock |
| 5,606,668 A | 2/1997 | Shwed |
| 5,608,447 A | 3/1997 | Farry et al. |
| 5,617,540 A | 4/1997 | Civanlar et al. |
| 5,619,716 A | 4/1997 | Nonaka et al. |
| 5,621,728 A | 4/1997 | Lightfoot et al. |
| 5,623,601 A | 4/1997 | Vu |
| 5,623,605 A | 4/1997 | Keshav et al. |
| 5,625,670 A | 4/1997 | Campana, Jr. et al. |
| 5,636,218 A | 6/1997 | Ishikawa et al. |
| 5,636,371 A | 6/1997 | Yu |
| 5,650,994 A | 7/1997 | Daley |
| 5,666,487 A | 9/1997 | Goodman et al. |
| 5,671,279 A | 9/1997 | Elgamal |
| 5,677,905 A | 10/1997 | Bigham et al. |
| 5,684,716 A | 11/1997 | Freeman |
| 5,684,799 A | 11/1997 | Bigham et al. |
| 5,684,800 A | 11/1997 | Dobbins |
| 5,691,973 A | 11/1997 | Ramstrom et al. |
| 5,713,075 A | 1/1998 | Threadgill et al. |
| 5,717,747 A | 2/1998 | Boyle |
| 5,721,908 A | 2/1998 | Lagarde et al. |
| 5,729,545 A | 3/1998 | Libman |
| 5,732,219 A | 3/1998 | Blumer et al. |
| 5,734,961 A | 3/1998 | Castille |
| 5,742,604 A | 4/1998 | Edsall et al. |
| 5,764,626 A | 6/1998 | VanDervort |
| 5,765,152 A | 6/1998 | Erickson |
| 5,774,551 A | 6/1998 | Wu et al. |
| 5,774,670 A | 6/1998 | Montulli |
| 5,784,450 A | 7/1998 | Stahl |
| 5,790,664 A | 8/1998 | Coley et al. |
| 5,793,763 A | 8/1998 | Mayes et al. |
| 5,793,964 A | 8/1998 | Rodgers et al. |
| 5,793,966 A | 8/1998 | Amstein et al. |
| 5,797,035 A | 8/1998 | Birrittella et al. |
| 5,799,292 A | 8/1998 | Hekmatpour |
| 5,802,047 A | 9/1998 | Kinoshita |
| 5,802,053 A | 9/1998 | Bollella et al. |
| 5,802,320 A | 9/1998 | Bachr et al. |
| 5,812,671 A | 9/1998 | Ross |
| 5,813,863 A | 9/1998 | Sloane et al. |
| 5,822,306 A | 10/1998 | Catchpole |
| 5,822,524 A | 10/1998 | Chen et al. |
| 5,842,125 A | 11/1998 | Modzelesky et al. |
| 5,845,267 A | 12/1998 | Ronen |
| 5,862,391 A | 1/1999 | Salas et al. |
| 5,870,550 A | 2/1999 | Wesinger et al. |
| 5,878,115 A | 3/1999 | Valentine et al. |
| 5,878,347 A | 3/1999 | Joensuu et al. |
| 5,890,064 A | 3/1999 | Wildergen et al. |
| 5,892,900 A | 4/1999 | Ginter et al. |
| 5,905,726 A | 5/1999 | Gupta |
| 5,913,040 A | 6/1999 | Rakavy et al. |
| 5,913,164 A | 6/1999 | Pawa et al. |
| 5,915,008 A | 6/1999 | Dulman |
| 5,918,018 A | 6/1999 | Gooderum et al. |
| 5,918,019 A | 6/1999 | Valencia |
| 5,926,745 A | 7/1999 | Threadgill et al. |
| 5,944,795 A | 8/1999 | Civanlar |
| 5,948,069 A | 9/1999 | Kitai et al. |
| 5,949,871 A | 9/1999 | Kabay et al. |
| 5,959,990 A | 9/1999 | Frantz et al. |
| 5,982,773 A | 11/1999 | Nishimura et al. |
| 5,983,350 A | 11/1999 | Minear et al. |
| 5,987,140 A | 11/1999 | Rowney et al. |
| 5,991,301 A | 11/1999 | Christie |
| 6,009,464 A | 12/1999 | Hamilton et al. |
| 6,009,503 A | 12/1999 | Liedtke |
| 6,011,790 A | 1/2000 | Fisher |
| 6,016,318 A | 1/2000 | Tomoike |
| 6,018,658 A | 1/2000 | Blachier |
| 6,035,105 A | 3/2000 | McCloghrie et al. |
| 6,044,264 A | 3/2000 | Houtari et al. |
| 6,058,288 A | 5/2000 | Reed et al. |
| 6,058,429 A | 5/2000 | Ames et al. |
| 6,061,349 A | 5/2000 | Coile et al. |
| 6,064,671 A | 5/2000 | Killian |
| 6,064,723 A | 5/2000 | Cohn |
| 6,069,890 A | 5/2000 | White et al. |
| 6,073,015 A | 6/2000 | Berggren et al. |
| 6,092,096 A | 7/2000 | Lewis |
| 6,138,107 A | 10/2000 | Elgamal |
| 6,141,689 A | 10/2000 | Yasrebi |
| 6,195,357 B1 | 2/2001 | Polcyn |
| 6,209,040 B1 | 3/2001 | Acton et al. |
| 6,366,586 B1 | 4/2002 | Christie |
| 6,366,893 B2 | 4/2002 | Hannula et al. |
| 6,370,126 B1 | 4/2002 | De Baere et al. |
| 6,618,754 B1 | 9/2003 | Gosling |
| 6,647,422 B2 | 11/2003 | Wesinger et al. |
| 6,658,568 B1 | 12/2003 | Ginter et al. |
| 6,675,146 B2 | 1/2004 | Rhoads |
| 6,976,258 B1 | 12/2005 | Goyal et al. |
| 6,985,937 B1 | 1/2006 | Keshav et al. |
| 7,047,241 B1 | 5/2006 | Erickson |
| 7,386,880 B2 | 6/2008 | Wesinger et al. |
| 8,117,298 B1 | 2/2012 | Wesinger et al. |
| 2004/0133637 A1 | 7/2004 | Wesinger, Jr. et al. |
| 2006/0015627 A1 | 1/2006 | Wesinger, Jr. et al. |
| 2006/0015628 A1 | 1/2006 | Wesinger, Jr. et al. |
| 2006/0047833 A1 | 3/2006 | Wesinger, Jr. et al. |
| 2006/0047834 A1 | 3/2006 | Wesinger, Jr. et al. |
| 2009/0037991 A1 | 2/2009 | Ellis et al. |

OTHER PUBLICATIONS

Brown, Mark R. Using Netscape 2, Que Corporation, Special Edition, pp. 885-891, 1995.
G. Stephan Nace, "Search Tools on the Internet", [Internet] http://www.nashville.com/-gsnace/search.htm 1993.
Internet Engineering Task Force, Requirements for Internet Hosts-Communication Layers, RFC 1122, Oct. 1989, pp. 1-114.
Ioannidis, John, "Configuring Multiple IP Addresses", Apache HTTP Server Version 1.3, Feb. 26, 2008.
McLemore, Benjamin, "How do I alias a server and make it look like a dedicated server," Dec. 9, 1994, 11 pages.
Najork, Marc, "Web-based Algorithm Animation," Proceedings of the 38th Conference on Design Automation, Las Vegas, Nevada, Jun. 18-22, 2001, pp. 506-511.
NCSA HTTPd Multihome/Virtualhost support, http://hoohoo.nsca.uiuc.edu/docs/tutorials/VirtualHost.html, Oct. 20, 1995, 3 pages.
Richman, "Oracle Web Package Raises Internet Ante," Computerworld, vol. 29, Issue 44, pp. 20ff, Oct. 30, 1995.
Stevens, W. Richard "UNIX Network Programming," Prentice Hall, Inc. 1990, pp. 55-57, 334-339.
William Cross, "All-In-One-Search Page", [Internet] http://www.albany.net/all1www.html, 1995.
U.S. Appl. No. 08/607,068 Final Office Action mailed Jul. 27, 1998.
U.S. Appl. No. 08/607,068 Office Action mailed Apr. 8, 1998.
U.S. Appl. No. 10/342,117 Final Office Action mailed Sep. 7, 2005.
U.S. Appl. No. 10/342,117 Office Action mailed Jan. 6, 2005.
U.S. Appl. No. 10/655,575 Final Office Action mailed Nov. 24, 2009.
U.S. Appl. No. 10/655,575 Office Action mailed Feb. 18, 2009.
U.S. Appl. No. 10/655,741 Office Action mailed Oct. 8, 2008.
U.S. Appl. No. 10/700,407 Final Office Action mailed Dec. 28, 2007.
U.S. Appl. No. 10/700,407 Office Action mailed Apr. 6, 2007.
U.S. Appl. No. 11/155,300 Final Office Action mailed Jan. 20, 2010.
U.S. Appl. No. 11/155,300 Office Action mailed Apr. 1, 2009.
U.S. Appl. No. 11/155,299 Final Office Action mailed Dec. 7, 2009.
U.S. Appl. No. 11/155,299 Office Action mailed Mar. 25, 2008.
U.S. Appl. No. 11/156,994 Final Office Action mailed Jan. 21, 2010.
U.S. Appl. No. 11/156,994 Office Action mailed Apr. 2, 2009.
U.S. Appl. No. 11/155,301 Office Action mailed May 11, 2009.
U.S. Appl. No. 12/841,045 Office Action mailed Mar. 16, 2011.
U.S. Appl. No. 13/341,594 Office Action mailed Apr. 3, 2012.
U.S. Appl. No. 13/341,660 Office Action mailed Apr. 3, 2012.
U.S. Appl. No. 13/341,674 Office Action mailed Apr. 3, 2012.
U.S. Appl. No. 13/341,696 Office Action mailed Mar. 29, 2012.
U.S. Appl. No. 13/341,716 Office Action mailed Mar. 26, 2012.

U.S. Appl. No. 13/341,743 Office Action mailed Apr. 3, 2012.
U.S. Appl. No. 09/189,697 Office Action mailed Jan. 29, 2003.
U.S. Appl. No. 09/189,697 Office Action mailed Nov. 20, 2001.
U.S. Appl. No. 09/189,697 Office Action mailed May 23, 2001.
U.S. Appl. No. 09/189,697 Final Office Action mailed Sep. 13, 2000.
U.S. Appl. No. 09/189,697 Office Action mailed Mar. 3, 2000.

```
struct PROCESS_TYPES DefaultProcessTypes[ ] = {
/* Animation scripts (Server push) */
"ani',      TY_ANIMATION,   NULL,           ProcessANI,
"cgi",      TY_CGI,         NULL,           ProcessCGI,
/* html's */
"html",     TY_HTML,        "text/html",    SendFile,
/* shtml's will be ser ver passed */
"shtml",    TY_SHTML,       "image/html",   ProcShtml,
/* gif graphics Images */
"gif",      TY_GIF,         "image/gif",    SendFile,
/* jpeg graphics Images*/
"jpeg",     TY_JPEG,        "image/jpeg",   SendFile,
"jpg",      TY_JPEG,        "image/jpeg",   SendFile,
"jpe",      TY_JPEG,        "image/jpeg",   SendFile,
/* map Image Maps */
"map",      TY_MAP,         NULL,           ProcessMap,
/* default is to send file */
"",         TY_DEFAULT,     "text/html",    SendFile,
/* Structure terminator */
NULL,       TY_ALLDONE,     NULL,           NULL};
```

Fig. 3

```
PORT              = 80
RULE1             = {
        TIME      = "1AM-12PM"
}
WWW.SRMC.COM      = {
        .CGI      = "PROCESSCGI"
        ROOT      = "/HOME/HONOLULU/HTML"
}
WWW.HONOLULU.NET  = {
        .CGI      = ""
        ROOT      = "/HOME/HONOLULU/HTML
}
WWW.SANJOSE.NET   = {
        .CGI      = "PROCESSCGI"
        ALLOW     = {
        *.SRMC.COM
        205.138.192.*
        205.138.192.0/23
        }
        DENY      = {
        MISTERPAIN.COM
        }
}
WWPROXY.SRMC.COM  = {
        MODE      = RT_SERVERPROXY
}
NS.SRMC.COM       = {
        ALLOW     = {
        192.168.0.*
        192.168.1.*    = RULE1
        192.168.2.*    = {
                TIME           = "1AM-12PM"
        }
        192.168.3.*    = 192.168.2.*
        }
}
MJU.SRMC.COM      = {
        ALLOW     = {
        192.168.0.0.23            = RULE1
        }
        DENY      = {
        192.168.0.*    = {
                TIME           = "12PM-1AM"
        }
        }
}
```

(REMOTE IP OR NAME) USERNAME [DATE & TIME] "GET ...HTTP/1.0" ERC BYTESXFRD

(HOST) HITBY (REMOTE IP OR NAME) USERNAME [DATE & TIME]
"GET ...HTTP/1.0" ERC BYTESXFRD REFERRER

MULTI-HOMED WEB SERVER WITH ANIMATION PLAYER

CROSS-REFERENCE TO RELATED APPLICATIONS

This application is a continuation of U.S. patent application Ser. No. 12/841,045, filed Jul. 21, 2010, now issued as U.S. Pat. No. 8,117,298, which is a continuation of U.S. patent application Ser. No. 11/156,994, filed Jun. 16, 2005, now abandoned, which is a continuation of U.S. patent application Ser. No. 10/700,407, filed Nov. 3, 2003, now issued as U.S. Pat. No. 7,386,880, which is a continuation of U.S. patent application Ser. No. 09/189,697, filed Nov. 10, 1998, now issued as U.S. Pat. No. 6,647,422, which is a divisional of U.S. patent application Ser. No. 08/607,068, filed Feb. 26, 1996, now issued as U.S. Pat. No. 5,870,550, all of which are hereby incorporated by reference as if set forth herein.

BACKGROUND OF THE INVENTION

1. Field of the Invention

The present invention relates to Web servers, i.e., server software for delivering content through the World Wide Web.

2. State of the Art

The Internet, and in particular the content-rich World Wide Web ("the Web"), have experienced and continue to experience explosive growth. The Web is an Internet service that organizes information using hypermedia. Each document can contain embedded reference to images, audio, or other documents. A user browses for information by following references. Web documents are specified in HyperText Markup Language (HTML), a computer language used to specify the contents and format of a hypermedia document (e.g., a homepage). HyperText Transfer Protocol (HTTP) is the protocol used to access a Web document.

Web servers offer Web services to Web clients, namely Web browsers. Primarily, Web servers retrieve Web documents and send them to a Web browser, which displays Web documents and provides for user interaction with those documents. Unlike Web browsers, of which there are many, the number of commercially available Web server packages, although growing, remains small. Currently, popular Web servers include those available from Netscape Communications, National Center for Supercomputing Applications (NCSA), and CERN.

Ideally, a Web server should be able to respond to and expeditiously service every connection request it receives, regardless of the volume of requests. The job of getting the request to the server and the reply back to the requester falls to the telecommunications infrastructure. In reality, however, because of machine limitations, there is a limit to the number of requests the server can serve within a given period of time without slowing down the machine to an extent that, from the viewpoint of the users, is perceptible, irritating, or simply intolerable. Web servers have typically followed one of two extreme approaches, either "rationing service" by denying further requests once some limiting number of requests are already pending, or attempting to service all requests received and hence slowing the machine to a crawl during extremely busy periods.

Webs servers, most of which are written for UNIX, often run under INETD ("eye-net-D"), an Internet services daemon in UNIX. (A daemon is a UNIX process that remains memory resident and causes specified actions to be taken upon the occurrence of specified events.) Typically, if more than sixty connection requests occur within a minute, INETD will shut down service for a period of time, usually five minutes, during which service remains entirely unavailable. Such interruptions are clearly undesirable, both on the part of the client-requester and the content provider. In the case of other Web servers, when the server is brought up, some fixed number of copies of the server, e.g. 50, are started. Up to 50 simultaneous connections may therefore be handled. A request for a 51st connection, however, will be denied, even if many or all of the 50 existing connections are temporarily idle.

Other considerations further complicate the picture of what is desired from a Web server, including considerations such as cost, perception and the very dynamic nature of the Web and Web content. Typically, only large organizations, or smaller organizations having considerable technical expertise, have their own Web servers. Establishing and running a Web server can entail a significant and ongoing investment in time and money. The alternative is for a person or organization to pay an Internet Service Provider (ISP) to house its content on the Web and make it available through the ISP's Web server. Of course, most organizations (and people) would like to be perceived as not lacking in either money or expertise. In cyberspace, therefore, an important factor in how an organization is perceived is its Web address. A Web address of XYZCorp.com commands, in a manner of speaking, immediate attention and respect, whereas a Web address of ISP.com/XYZCorp does not, at least to the same extent.

For a person or organization to have the best of both worlds, i.e., house its content on someone else's server but have it appear to be their own, the server must provide the capability of multi-homing. A multi-homed server behaves as multiple servers in one, responding to requests to multiple addresses, e.g. ISP.com, XYZCorp.com, johnsmith.com, etc. Some existing servers are multi-homed. However, the multi-homing capabilities of existing servers are quite limited. For example, although different customers may have different needs and desire different levels of service, in existing multi-homed servers, as regards a particular physical machine, the core functionality offered by the server (whether extensive or more limited) is necessarily the same for each customer.

An entirely different question concerns the extensibility of Web servers. Because the Web is continually in flux, a Web server must provide a mechanism that allows for extensions to be added to the Web server, or face obsolescence. Presently, the commonly accepted mechanism for extending the capabilities of existing Web servers is one called the Common Gateway Interface (CGI). The CGI specification has emerged as a standard way to extend the services and capabilities of a Web server having a defined core functionality. CGI "scripts" are used for this purpose. CGI provides an Application Program Interface, supported by CGI-capable Web servers, to which programmers can write to extend the functionality of the server. CGI scripts, however, although they may be compiled, are typically interpreted, meaning that they run at least ten times slower, typically, than compiled binary code. As the complexity of the Web, and hence the amount of time spent by a Web server running CGI scripts, increases, the Web server unavoidably suffers a significant performance hit.

What is needed, then, is a Web server that overcomes the foregoing difficulties.

SUMMARY OF THE INVENTION

The present invention, generally speaking, provides a Web server having a multi-homed, modular framework. The modular framework allows extensions to the Web server to be easily compiled into the Web server, allowing the extensions to run natively as part of the server instead of incurring the overhead typical of CGI scripts, for example. The multi-homing capabilities of the Web server provide the appearance to Web users of multiple distinct and independent servers, allowing a small company or individual to create the same kind of Web presence enjoyed by larger companies. In effect, multiple virtual servers run on the same physical machine. The Web server as a whole is easily extensible to allow additional capabilities to be provided natively within the Web server itself. Furthermore, each virtual server is independently configurable in order to turn different capabilities on or off or to modify operation of the virtual server. The Web server is also provided with enhanced security features, built-in animation capability, and other features that afford maximum flexibility and versatility.

BRIEF DESCRIPTION OF THE DRAWINGS

The present invention may be further understood from the following description in conjunction with the appended drawing. In the drawing:

FIG. 3 is an example of a database-like data structure that allows extensions to the Web server to be easily added so as to run natively as part of the Web server;

FIG. 4 is an example of a portion of the master configuration file of FIG. 1;

FIG. 5 is an example of a conventional Web server log entry;

FIG. 6 is an example of a Web server log entry in accordance with one aspect of the present invention.

DETAILED DESCRIPTION OF THE PREFERRED EMBODIMENT

Figure 1:
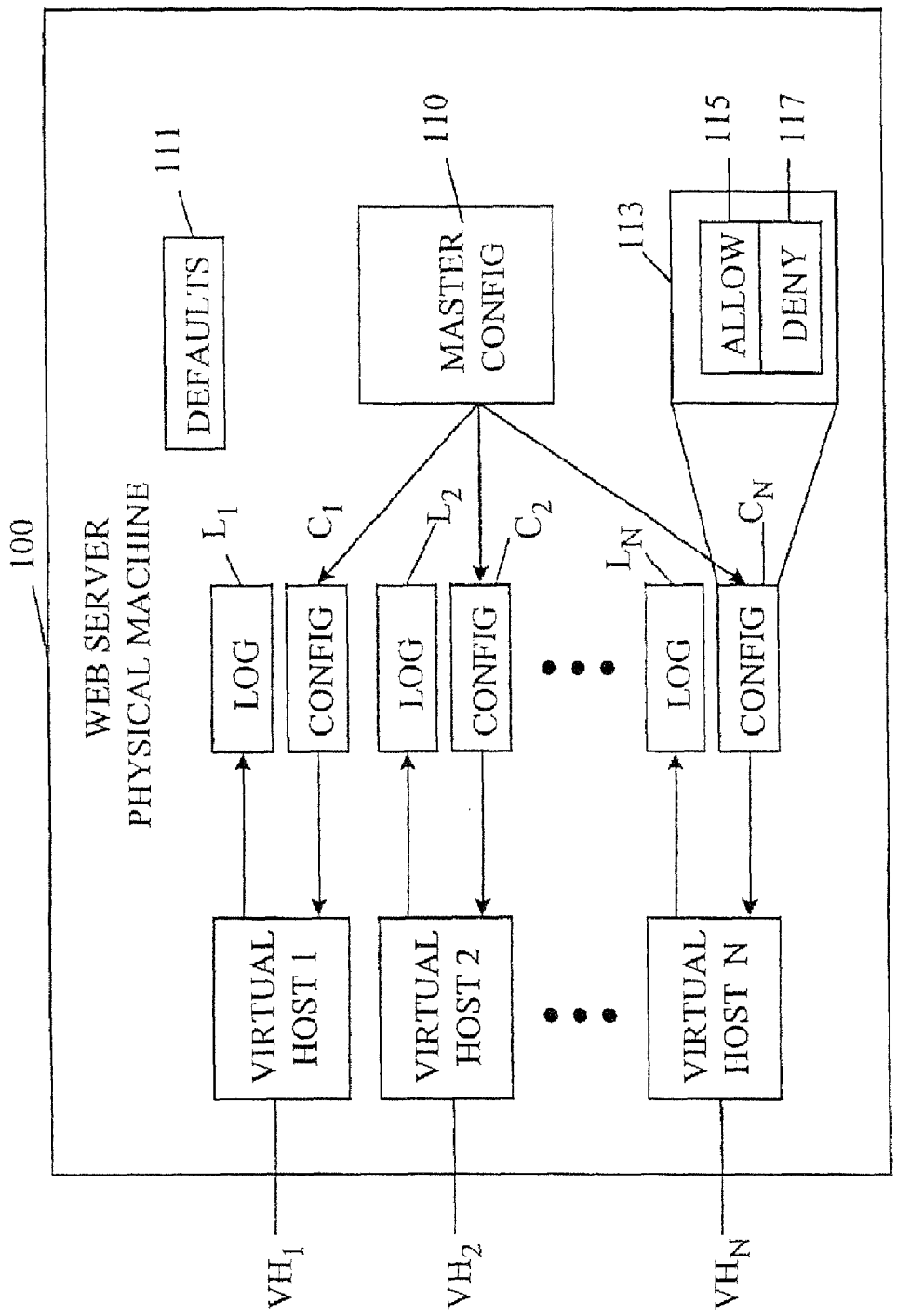
FIG. 1 is a block diagram of one embodiment of the Web server of the present invention.

Referring now to FIG. 1, an overview of the present Web server will be provided. The Web server is a software package that runs on a physical machine 100, e.g., a super-minicomputer such as a SunServer machine available from Sun Microsystems of Menlo Park, Calif., or on any of a wide variety of suitable UNIX platforms.

Conventionally, a Web server is provided with some fixed feature set. To provide additional capabilities, CGI scripts are used. Furthermore, the logical view of the Web server on the Web is the same as the physical view of the underlying hardware. That is, a single physical machine running a conventional Web server appears on the Web as a single logical machine.

The present Web server, on the other hand, although it runs on a single physical machine 100, appears on the Web as multiple virtual hosts VH1 through VHn. Each virtual host has a separate configuration sub-file (sub-database) C1, C2, etc., that may be derived from a master configuration file, or database, 110. A defaults file 111 is used to provide plug-in extensibility of the Web server. The defaults file is compiled as part of the Web server and expresses at the program level what the program is to do to provide various kinds of functionality. The configuration sub-files, on the other hand, are text files that may be used to enable or disable different functions for each virtual host.

Each virtual host also has its own separate log file L1, L2, etc. This feature allows for users of different hosts on the same machine to have access to up-to-the minute log information without allowing access to logs of other pages—a very useful feature for ISPs, for example. Each virtual host is capable of servicing many simultaneous connections. The number of allowable simultaneous connections is configurable and may be limited to a predetermined number, or may be limited not by number but only by the load currently experienced by the physical machine. The number of maximum allowable connections or the maximum allowable machine load may be specified in the configuration file.

As described in greater detail in connection with FIG. 5, each configuration file C1, C2, etc., may have an access rules database 113, including a Allow portion 115, a Deny portion 117, or both. Using the access rules database 113, the Web server is able to perform many of the functions of a conventional firewall, thereby enhancing network security.

Figure 2:
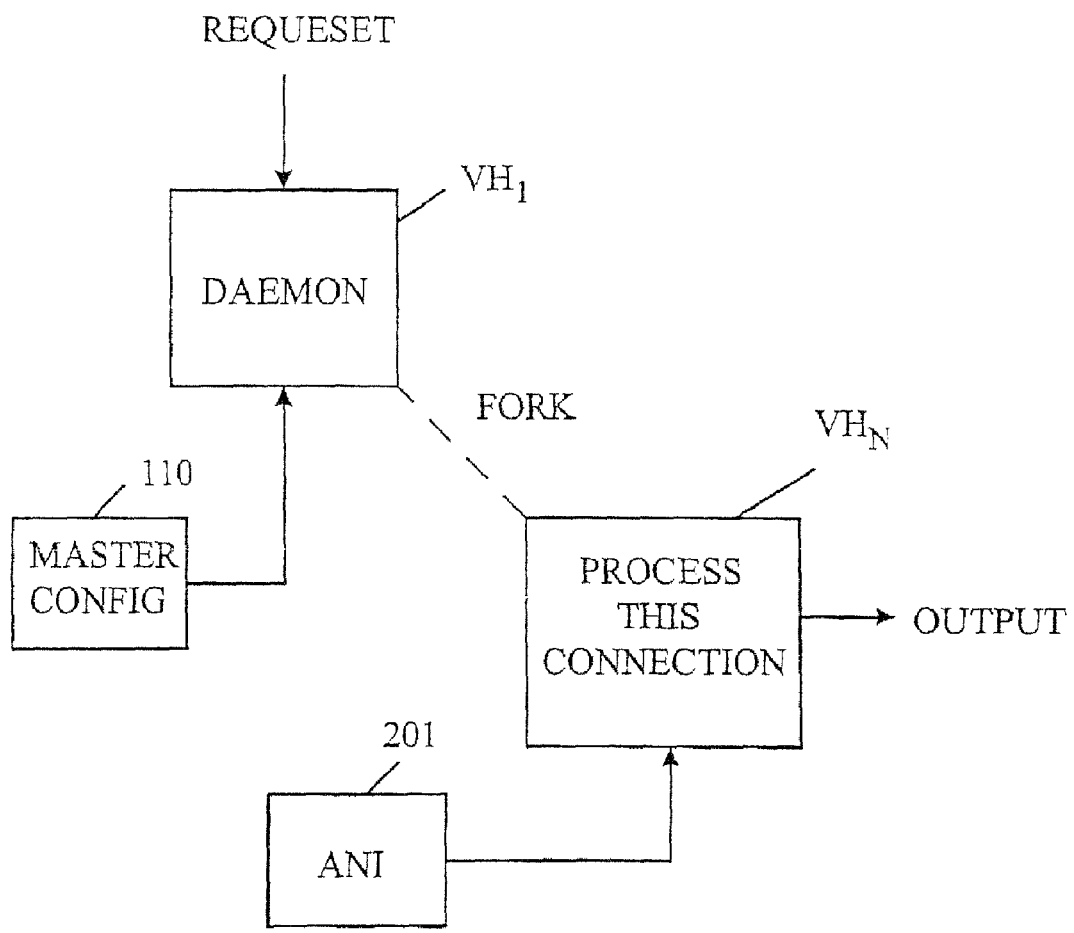
FIG. 2 is a block diagram illustrating the manner in which the present Web server handles connection requests.

The Web server is self-daemoning, meaning that it is not subject to the limitations ordinarily imposed by the usual Internet daemon, INETD. Referring to FIG. 2, when the Web server is brought up, it first reads in the master configuration file and then becomes a daemon and waits for connection requests. When a connection request is received, the Web server "forks a copy" of itself, using the forking capabilities of UNIX, to create a virtual host VHn to handle that connection request. When a parent process is forked to create a child process, the child process runs off the same base code as the parent process but using its own set of variables. In particular, the child process will typically use its own sub-database from within the master configuration database to determine the configuration of that particular virtual host. Child processes are created "on demand" as connection requests are received and complete running as service of those connection requests is completed.

As described in greater detail hereinafter, animation capabilities, instead of being an add-on feature provided through a CGI script, are built into the server itself. Hence, in FIG. 2, when a request is received on a connection to process an animation file 201, the child process VHn belonging to that connection is able to process the animation file directly.

Animation is one example of a recent enhancement now supported by some Web servers, although typically through CGI and not directly. Numerous and varied other enhancements are sure to follow. Hence, the present Web server, although it provides a default feature set, allows for that default feature set to be readily expanded.

The default feature set is defined in the defaults file 111, an example of which is shown in FIG. 3. The defaults file is, in effect, a database that matches different types of requests with modules available for handling those requests. The database is a table having, in the illustrated embodiment, four columns. In the first column is the file extension received as part of the request. Examples of file extensions are "ani" (animation), "cgi," "html," "shtml" (server-parsed HTML), etc. In the second column is a type identifier used internally by the Web server, e.g., TY.sub.—ANIMATION, TY.sub.—CGI, etc. In the third column is type information returned to the Web browser, e.g., "text/html," "image/gif," etc. In some instances, this type is not clearly defined in advance but depends on the module called to process the request. The type returned to the browser may therefore be NULL. Finally, in the fourth column is the module to be called to process the request, e.g., ProcessANI (an animation player), ProcessCGI, etc.

The defaults table of FIG. 3 serves as the foundation of a modular framework that allows extensions to the Web server to be easily added so as to run natively as part of the Web server. In one embodiment, extensions are added by modifying the source code file containing the defaults table, to add a new row to the table, for example, or to modify an existing row. A new module having new capabilities might be substituted for an existing module, for example. The defaults file is then recompiled and linked to the Web server. Preferably, a software development kit is provided with the Web server to facilitate this process.

Hence, a mechanism is established that allows modules to be added without the need to rebuild the entire Web server. In accordance with this mechanism, adding an additional server feature involves the following steps:

1. Edit the defaults file (the list of processes) and add an entry for the specific file extension. Add the procedure name to be used for processing this new type. Add an "#include" file defining the procedure at the beginning of the defaults table.
2. Write the procedure. The procedural call to the process will pass two parameters: a File Descriptor to send output to; and a file Name of the document/file to process. The procedure should be written accordingly.
3. Compile the procedure, link it into the Web server, and test.

The modular framework just described governs the capabilities of the overall Web server. All customers may not want to pay for use of a high-performance Web server having a comprehensive feature set. The multi-homing capabilities of the present Web server, however, allows the same code to be configured differently for each of multiple virtual hosts, thereby catering to the preferences (and budgets) of different classes of customers. The effect is the same as offering a range of different Web server products of different capabilities, but with the distinct advantage that only a single code package need be produced and maintained.

Referring again to FIG. 1, apart from the defaults database, each virtual host has its own configuration sub-file C1, C2, etc. Within the configuration sub-file of each virtual host is a text-file database, not compiled, that is similar in concept to the database of FIG. 3. However, the process to be called for a particular type of request may vary, virtual host to virtual host, from the default process specified in the defaults database. On a virtual host that is configured to have a more limited feature set, for example, CGI scripts may not be allowed. Therefore, the process specified for CGI, instead of ProcessCGI, might be NULL. Similarly with other capabilities. The differences between the configuration database and the defaults database, instead of limiting the capabilities of the virtual host, may actually increase the capabilities of the virtual host. For example, for HTML requests, instead of the usual SendFile process, the process ProcSHTML may be specified. This configuration would allow all HTML files to include other files, cause execution of other programs, etc., resulting in a dynamic document rather than a static document.

Furthermore, the Web server may be a "client application" of a license server, described in U.S. patent application Ser. No. 08/607,081 AUTOMATED SYSTEM FOR MANAGEMENT OF LICENSED SOFTWARE now U.S. Pat. No. 5,790,664, filed on even date herewith, incorporated herein by reference. Using the system described in the foregoing application, features of the Web server may be enabled or disabled on a feature-by-feature and virtual host-by-virtual host basis.

An example of a portion of a master configuration file is shown in FIG. 4. Within the master configuration file database, different portions of the file form sub-databases for different virtual hosts. Each sub-database may specify a root directory for that particular virtual host.

Also as part of the configuration file of each virtual host, an access rules database may be provided governing access to the virtual host, i.e., which connections will be allowed and which connections will be denied. Many of the features more commonly included in a firewall may therefore be included in the Web server itself. The syntax of the access rules database is such as to allow great flexibility in specifying not only what machines are or are not to be allowed access but also when such access is allowed to occur. The access rules database may have an Allow portion, a Deny portion or both. If the access rules database has an Allow portion, only connections from machines matching the Allow rules will be allowed, regardless of whether there is also a Deny portion. If there is a Deny portion but no Allow portion, then connections from machines matching the Deny rules will be denied and all other connections will be allowed. Machines may be specified by name or by IP address, and may include "wildcards," address masks, etc., for example: MisterPain.com, *.srmc.com, 192.168.0.*, 192.168.0.0/24, and so on.

Time restrictions may be included in either the Allow rules or the Deny rules. For example, access may be allowed from 1 am to 12 pm; alternatively, access may be denied from 12 pm to 1 am. Also, rules may be given identifiers, such as RULE1, RULE2, etc., and repeated elsewhere within the configuration sub-file of the virtual host.

All access rules must be satisfied in order to gain access to a virtual host. Depending on the virtual host, however, further levels of access scrutiny may be specified within the configuration sub-file. Each successive level of access scrutiny includes all previous levels. The first level of access scrutiny is that all rules must be satisfied, as previously described. The second level of access scrutiny is that the accessing machine must have a DNS (Domain Name Services) entry. Having a DNS entry lends at least some level of legitimacy to the accessing machine. The third level of access scrutiny is that the accessing machine must in addition have a reverse DNS entry. The fourth and most stringent level of access scrutiny is that the forward DNS entry and the reverse DNS entry must match.

If access is granted and a connection is opened, when the connection is later closed, a log entry is made recording information about that access. One important feature of the present Web server is that log entries identify the particular virtual host that was accessed. Another important feature is that log entries identify the "referrer," i.e., the source of any link that may have been followed to get to the Web site that was accessed. The owner of a Web site may advertise that site through various different channels. In order to determine what works and what does not, in terms of generating hits on a Web site, one must know how someone came to access that Web site.

Referring to FIG. 5, conventional log entries are typically of a format similar to the one shown. The IP address or name 501 of the accessing machine is recorded, followed by the UserName 503, if any, entered during the course of the access, the date and time 505, the connection request 507 as it was received, an error code ERC (509) specifying any error that may have occurred, and a count 511 of the number of bytes transferred. As shown in FIG. 6, the present Web server logs in addition the identity of the virtual host (651) and the referrer (653). Log reports may be generated from this information, listing, for example, the top referrers generating hits to a Web site, etc. Log reports may be generated on a per-host basis or may be generated for the physical machine, i.e., all virtual hosts together.

Figure 7:
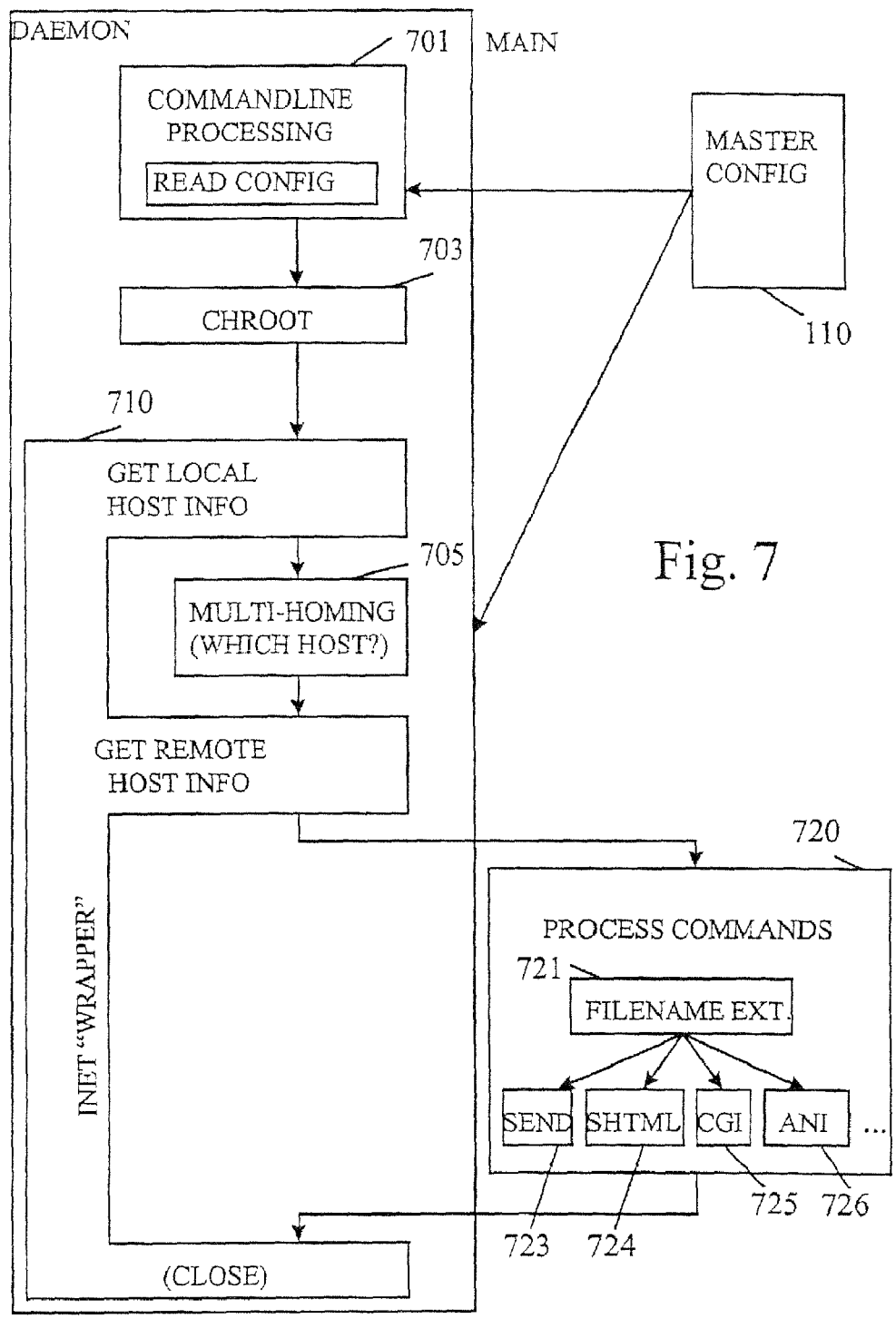
FIG. 7 is a block diagram illustrating in greater detail the structure of the present Web server.

Referring now to FIG. 7, the logical structure of the present Web server is shown in greater detail.

The main execution thread of the Web server is controlled by a daemon. In FIG. 7, the daemon includes elements 701, 703 and 705. Although the daemon mode of operation is the default mode, the same code can also be run interactively under the conventional INETD daemon. Hence, when the Web server is first brought up, command-line processing is performed in block 701 to determine the mode of operation (daemon or interactive), which configuration file to read, etc. For purposes of the present discussion, the daemon mode of operation, which is the default, will be assumed.

Immediately thereafter, the daemon changes user in block 703 so as to become an unprivileged user. This step of becoming an unprivileged user is a security measure that avoids various known security hazards encountered, for example, when CGI scripts or other programs are allowed to run.

Only after the daemon has read the specified configuration file and become an unprivileged user does the daemon actually become a daemon. By daemonizing after the configuration file (e.g., the master configuration file) has been read in, the configuration file in effect becomes "hard coded" into the program such that the program no longer has read it in. The daemon then waits to receive a connection request.

When a connection request is received, the daemon forks a copy of itself to handle the connection request. The daemon then uses a piece of code referred to herein as an INET Wrapper 710 to check on the local side of the connection and the remote side of the connection to determine, in accordance with the appropriate Allow and Deny databases, whether the connection is to be allowed.

First the address and name (if possible) are obtained of the virtual machine for which a connection is requested. Once the local host has been identified by name or at least by IP address, the master configuration database is scanned to see if a corresponding sub-database exists for that local host. If so, the sub-database is set as the configuration database of the local host so that the master configuration database need no longer be referred to. If no corresponding sub-database is found, then by default the master configuration database is used as the configuration database. There may be any number of virtual machines, all independently configurable and all running on the same physical machine. The determination of which virtual host the daemon child process is to become is made in block 705, under the heading of "multi-homing."

Once the daemon child process has determined which host it is, the INET Wrapper is used to do checking on the remote host, i.e., the host requesting the connection. Recalling the different levels of access scrutiny described previously, first, the configuration database is consulted to determine the level of access scrutiny that will be applied. (The default level of access scrutiny is that no DNS entry is required.) Then, the address and name (if possible) are obtained of the machine requested the connection, and the appropriate level of access scrutiny is applied as determined from the configuration database.

If the remote host satisfies the required level of access scrutiny insofar as DNS entries are concerned, the INET Wrapper gets the Allow and Deny databases for the virtual host. First the Allow database is checked, and if there is an Allow database but the remote host is not found in it, the connection is denied. Then the Deny database is checked. If the remote host is found in the Deny database, then the connection is denied. All other rules must also be satisfied, regarding time of access, etc. If all the rules are satisfied, then the connection is allowed.

Once the connection has been allowed, the daemon invokes HTTP server code 720 that operates in large part in a similar manner as conventional Web server. The HTTP server code 720 processes commands by examining the filename extension associated with the command in block 721 and calling appropriate routines such as routines 723-726 to process those commands. When processing is completed, the connection is closed, if it has not already been closed implicitly.

Several features of the HTTP server code should be noted. The server includes code for handling both client and server proxies and redirects, all as part of the Web server. The server mode is determined in accordance with the configuration file of the virtual host handling the request. The configuration file may specify Client Proxy mode for the virtual host, in which case the virtual host proxies requests directed to the outside world, e.g., Web sites other than the present Web site. The configuration file may specify Server Proxy mode for the virtual host, in which case the virtual host proxies requests to access a different virtual host. The configuration file may specify Redirect mode, in which case the request is redirected to a different specified server, either a different virtual host on the same physical machine or a different physical machine altogether.

The animation player 726 of the present Web server also differs in significant respects from conventional animation players. Fundamentally, to the knowledge of the inventors, no other Web server incorporates an animation player as part of the native Web server code. By incorporating the animation player into the Web server itself, instead of adding the animation capabilities through the use of a CGI script, for example, animations may be handled much more efficiently. Furthermore, unlike conventional animation players, which typically just send a sequence of graphics, the present animation player provides full-fledge programming capability, including the ability to send one graphic at a specified time and then a next graphic at a next specified time. When a line is reached in the animation file that calls for a graphic to be displayed at a certain time, if that time has already passed, then that line is ignored by the animation player and the graphic is not sent. Instead the animation player tries to display the next graphic at the next specified time. In this manner, regardless of the speed of the connection, the playing time of the animation is always the same. On a slow connection, the user will see fewer frames, and on a fast connection the user will see more frames. The length of the animation will be the same. Also, labels may be included in the animation, and commands may be used to go to a specified label, or go to the beginning of the animation.

It will be appreciated by those of ordinary skill in the art that the invention can be embodied in other specific forms without departing from the spirit or essential character thereof. The foregoing description is therefore considered in all respects to be illustrative and not restrictive. The scope of the invention is indicated by the appended claims, and all changes which come within the meaning and range of equivalents thereof are intended to be embraced therein.

The invention claimed is:

1. A multi-homed web server comprising:
 a web server physical machine;
 web server software operable on said web server physical machine, the web server software configured to provide a plurality of virtual hosts on said web server physical machine;
 a processor for executing instructions operable within said multi-homed web server, wherein execution of the instructions by the processor:
 receives a request from a client over said public network to view an animation comprising a series a graphics;
 send a first graphic to said client;
 send a next graphic in said series of graphics at a specified time;

determine whether the specified time to send a subsequent graphic in said series of graphics has passed;

if said specified time has not passed, then send a next graphic in said series of graphics at said specified time; and if said specified time has passed, then send a next graphic in said series of graphics at a next specified time.

2. The web server of claim 1, wherein said animation is served said series of graphics is sent to said client.

3. The web server of claim 2, wherein the playing time said series of graphics is substantially equal regardless of the speed of said client's public network connection.

4. The web server of claim 1, further comprising labels in said animation file for providing navigation aids allowing a user to navigate within said animation.

5. The web server of claim 4, wherein at least one of said navigational aids allows said user to go to a specific label in said animation.

6. A non-transitory computer-readable storage medium, having embodied thereon a program executable by a processor to perform a method for serving animation using a web server, the method comprising:

receiving, by a multi-homed web server, a request from a client to view an animation comprising a series a graphics, said request directed to a selected home of said multi-homed web server;

sending, by said selected multi-homed web server, a first graphic to said client;

sending, by said selected multi-homed web server, a next graphic in said series of graphics at a specified time;

determining, by selected multi-homed said web server, whether the specified time to send a subsequent graphic in said series of graphics has passed;

if said specified time has not passed, then sending, by said selected multi-homed web server, a next graphic in said series of graphics at said specified time; and if said specified time has passed, then sending, by said selected multi-homed web server, a next graphic in said series of graphics at a next specified time.

7. The medium of claim 6, wherein said method is performed until said series of graphics is sent to said client.

8. The medium of claim 7, wherein the playing time said series of graphics is substantially equal regardless of the speed of said client's network connection.

9. The medium of claim 6, further comprising including labels in said animation file for providing navigation aids allowing a user to navigate within said animation.

10. The medium of claim 9, wherein at least one of said navigational aids allows said user to go to a specific label in said animation.

11. A method of serving animation using a multi-homed web server, comprising:

receiving, by a multi-homed web server, a request from a client to view an animation comprising a series a graphics, said request directed to a selected home of said multi-homed web server;

sending, by said selected multi-homed web server, a first graphic to said client;

sending, by said selected multi-homed web server, a next graphic in said series of graphics at a specified time;

determining, by selected multi-homed said web server, whether the specified time to send a subsequent graphic in said series of graphics has passed;

if said specified time has not passed, then sending, by said selected multi-homed web server, a next graphic in said series of graphics at said specified time; and if said specified time has passed, then sending, by said selected multi-homed web server, a next graphic in said series of graphics at a next specified time.

12. The method of claim 11, wherein said method is perform until said series of graphics is sent to said client.

13. The method of claim 12, wherein the playing time said series of graphics is substantially equal regardless of the speed of said client's network connection.

14. The method of claim 11, further comprising including labels in said animation file for providing navigation aids allowing a user to navigate within said animation.

15. The method of claim 14, wherein at least one of said navigational aids allows said user to go to a specific label in said animation.

* * * * *